(12) United States Patent
Matsushita et al.

(10) Patent No.: US 8,439,574 B2
(45) Date of Patent: May 14, 2013

(54) TAPERED ROLLER BEARING

(75) Inventors: Tomoki Matsushita, Iwata (JP); Yasuhiro Kanbori, Iwata (JP); Takashi Ueno, Iwata (JP)

(73) Assignee: NTN Corporation, Osaka (JP)

( * ) Notice: Subject to any disclaimer, the term of this patent is extended or adjusted under 35 U.S.C. 154(b) by 602 days.

(21) Appl. No.: 12/676,952

(22) PCT Filed: Sep. 1, 2008

(86) PCT No.: PCT/JP2008/065656
§ 371 (c)(1),
(2), (4) Date: Mar. 8, 2010

(87) PCT Pub. No.: WO2009/037959
PCT Pub. Date: Mar. 26, 2009

(65) Prior Publication Data
US 2010/0322547 A1    Dec. 23, 2010

(30) Foreign Application Priority Data
Sep. 18, 2007   (JP) .................................. 2007-240977

(51) Int. Cl.
*F16C 19/00* (2006.01)
*F16C 33/58* (2006.01)

(52) U.S. Cl.
USPC .......................................... 384/571; 384/450

(58) Field of Classification Search .............. 384/450, 384/571
See application file for complete search history.

(56) References Cited

U.S. PATENT DOCUMENTS

| | | | |
|---|---|---|---|
| 4,353,607 | A | 10/1982 | Sturniolo |
| 6,261,004 | B1 | 7/2001 | Tsujimoto et al. |
| 7,296,933 | B2 * | 11/2007 | Tsujimoto ..................... 384/571 |
| 2004/0114843 | A1 * | 6/2004 | Shimomura et al. .......... 384/569 |
| 2007/0041675 | A1 * | 2/2007 | Matsuyama et al. .......... 384/571 |
| 2007/0230852 | A1 * | 10/2007 | Tabata et al. ................. 384/576 |
| 2009/0003745 | A1 | 1/2009 | Tsujimoto |

FOREIGN PATENT DOCUMENTS

EP    0 023 641    2/1981
(Continued)

OTHER PUBLICATIONS

Supplementary European Search Report issued Oct. 24, 2011 in corresponding European Patent Application No. 08831855.5.

(Continued)

*Primary Examiner* — Phillip A Johnson
(74) *Attorney, Agent, or Firm* — Wenderoth, Lind & Ponack, L.L.P.

(57) ABSTRACT

A tapered roller bearing includes an outer ring, an inner ring, a tapered roller interposed between the outer ring and the inner ring, and a cage holding the tapered roller. The tapered roller bearing is for being used in an idler portion of an automobile transmission that switches between an idle state in which the outer ring rotates freely in relation to the inner ring and a shift state in which the outer ring rotates synchronously with the inner ring. In one embodiment, the tapered roller bearing has a ratio of roller dynamic load rating Cr to static load rating Cor of Cor/Cr≧1.4. In an alternative embodiment, $MoS_2$ processing is performed on a surface of the tapered roller and the tapered roller bearing has a ratio of roller dynamic load rating Cr to static load rating Cor of Cor/Cr≧1.3.

24 Claims, 6 Drawing Sheets

FOREIGN PATENT DOCUMENTS

| | | |
|---|---|---|
| EP | 1 746 298 | 1/2007 |
| JP | 56-28316 | 3/1981 |
| JP | 09-096352 | 4/1997 |
| JP | 09096352 A * | 4/1997 |
| JP | 2000-193069 | 7/2000 |
| JP | 2002-206540 | 7/2002 |
| JP | 2003-184870 | 7/2003 |
| JP | 2003-314542 | 11/2003 |
| JP | 2007-032679 | 2/2007 |
| JP | 2007-132469 | 5/2007 |
| WO | 2007/046263 | 4/2007 |

OTHER PUBLICATIONS

"Taper Roller Bearings Single Row", In: "SKF General Catalogue", Apr. 1989, SKF Group, W. Germany, XP002660609, pp. 528-531.

International Preliminary Report on Patentability and Written Opinion of the International Searching Authority mailed Apr. 15, 2010 in International (PCT) Application No. PCT/JP2008/065656.

International Search Report issued Oct. 14, 2008 in International (PCT) Application No. PCT/JP2008/065656.

Koyo Korogari Jikuuke Cat.No. 201, Koyo Seiko Co., Ltd., Apr. 21, 1992, B214-215.

* cited by examiner

IN CONTACT
[STATIC CONDITION]

[EARLY STAGE OF OPERATION]

CAGE CENTERED
[DURING OPERATION]

Fig. 6
PRIOR ART

TAPERED ROLLER BEARING

TECHNICAL FIELD

The present invention relates to a tapered roller bearing. In particular, the present invention relates to a tapered roller bearing used in an idler portion of an automobile transmission.

BACKGROUND ART

A synchronous mesh-type transmission shown in FIG. 6 is known as an example of a transmission. In the transmission, a main shaft 5 and a countershaft (not shown) disposed in parallel with a predetermined distance therebetween are held in a mission case (not shown) such as to rotate freely. The main shaft 5 interlocks with an output shaft (driving wheel side). The countershaft interlocks with an input shaft (engine side).

A countershaft gear 6 is integrally (or separately) provided on the countershaft. A main shaft gear 1 is mounted on the main shaft 5 with a tapered roller bearing A therebetween, such as to rotate freely. A teeth section 1a that constantly meshes with the countershaft gear 6 is integrally provided in a center portion of the outer circumferential surface of the main shaft gear 1. A clutch gear 7 is engaged in an interlocking manner with both end portions of the main shaft gear 1. The clutch gear 7 has spline teeth 7a on the outer circumference and an integrally formed conical cone 7b on one side. A synchro-mechanism 8 is disposed adjacent to the clutch gear 7.

The synchro-mechanism 8 includes a sleeve 81, a synchronizer key 82, a hub 83, a synchronizer ring 84, a pressing pin 85, and a spring 86. The sleeve 81 moves in an axial direction (left-right direction in FIG. 6) as a result of a selector being operated (not shown). The synchronizer key 82 is mounted on the inner circumference of the sleeve 81 such as to move freely in the axial direction. The hub 83 is engaged in an interlocking manner with the outer circumference of the main shaft 5. The synchronizer ring 84 is mounted on the outer circumference of the cone 7b of the clutch gear 7 such as to slide freely. The pressing pin 85 and the spring 86 elastically press the synchronizer key 82 to the inner circumference of the sleeve 81.

In a state shown in FIG. 6, the pressing pin 85 holds the sleeve 81 and the synchronizer key 82 in a neutral position. At this time, the main shaft gear 1 receives the rotation of the countershaft gear 6 and spins freely around the main shaft 5. On the other hand, when the sleeve 81 moves, for example, to the left in the axial direction from the state shown in FIG. 6 as a result of the selector being operated, the synchronizer key 82 moves to the left in the axial direction so as to follow the sleeve 81 and presses the synchronizer ring 84 against the angled surface of the cone 7b of the clutch gear 7. As a result, the rotation speed on the clutch gear 7 side decreases while the rotation speed on the synchro-mechanism 8 side increases.

When both rotation speeds become synchronized, the sleeve 81 moves further to the left in the axial direction and meshes with the spline teeth 7a of the clutch gear 7. The main shaft gear 1 and the main shaft 5 become interlocked via the synchro-mechanism 8. As a result, the rotation of the countershaft gear 6 is decelerated by the main shaft gear 1 at a predetermined transmission gear ratio, and the rotation is transmitted to the main shaft 5. At this time, the main shaft gear 1 rotates synchronously with the main shaft 5 and a bearing inner ring 2 of the tapered roller bearing A.

The tapered roller bearing A used in a main shaft gear mechanism of a synchronous mesh-type transmission of an automobile is configured by the main shaft gear 1 that also serves as a bearing outer ring, a pair of bearing inner rings 2, double-row tapered rollers 3, and a pair of cages 4. The bearing inner rings 2 have a raceway surface 2a on the outer circumferential surface and are fitted onto the outer circumference of the main shaft 5. The double-row tapered rollers 3 are disposed between double-row raceway surfaces 1c of the main shaft gear 1 and the raceway surfaces 2a of the pair of bearing inner rings 2. The cages 4 each hold a row of tapered rollers 3.

During the above-described gear shift, as a result of the synchronized rotations of the main shaft gear 1 and the bearing inner ring 2, the rollers 3 serving as rolling elements stop on the raceway surfaces 1c and 2a. On the other hand, when vibrations and the like from an external source are repeatedly applied, repeated minute sliding occurs between the rollers 3 and the raceway surfaces 1c and 2a. A phenomenon referred to as fretting, in which a contact surface becomes worn as a result of repeated relative, minute sliding, may become a problem.

To suppress the above-described fretting, a parkerization process (phosphate coating process) may be performed on the main shaft gear, the raceway surfaces of the bearing inner rings, and the rollers to reduce frictional resistance between the rollers and the raceway surfaces. However, the parkerized coating may deteriorate. A favorable, long-term fretting suppression effect cannot be expected.

Conventionally, an invention (Patent Document 1) is known that includes an unbalancing means and the like actualized by circumferentially uneven placement of the tapered rollers, unbalanced weight in the circumferential direction of the cages holding the tapered rollers, and unequal weights of the tapered rollers. In other words, as a result of the center of gravity of the cages being shifted from the center of rotation, relative rotation can be achieved from a stopped state through use of moment of inertia.

Patent Document 1: Japanese Patent Laid-open Publication No. 2000-193069

DISCLOSURE OF THE INVENTION

Problems to be Solved by the Invention

However, to form the pockets of the cage at an uneven pitch and the like, the number of rollers is required to be reduced compared to when the pitch is even. This is not preferable because load capacity decreases and bearing life is shortened. Therefore, both enhanced anti-fretting and enhanced bearing life are demanded of a tapered roller bearing used in an idler portion of a transmission.

In light of the above-described problems, an object of the present invention is to provide a tapered roller bearing that can suppress the occurrence of fretting without reducing fatigue life.

Means for Solving the Problems

To solve the above-described problems, a tapered roller bearing according to a first aspect of the present invention includes an outer ring, an inner ring, a tapered roller interposed between the outer ring and the inner ring, and a cage holding the tapered roller. The tapered roller bearing is used in an idler portion of an automobile transmission that switches between an idle state in which the outer ring rotates freely in relation to the inner ring and a shift state in which the outer ring rotates synchronously with the inner ring. The tapered roller bearing includes a fretting suppressing means configured by a ratio of roller dynamic load rating Cr to static load rating Cor being set to Cor/Cr≧1.4.

The inventors of the present invention have confirmed through tests that fretting wear occurs when the synchronous rotation is performed in a state in which contact surface pressure between the roller and raceway surfaces exceed 2200 MPa. The required dynamic load rating is determined by the required life of the bearing. To reduce contact surface pressure to under 2200 MPa, the ratio of static load rating to dynamic load rating is further determined. As a result of the ratio of roller dynamic load rating Cr to static load rating Cor being set to Cor/Cr≧1.4, contact surface pressure between the roller and the raceway surfaces can be reduced to under 2200 MPa.

A tapered roller bearing according to a second aspect of the present invention includes an outer ring, an inner ring, a tapered roller interposed between the outer ring and the inner ring, and a cage holding the tapered roller. The tapered roller bearing is used in an idler portion of an automobile transmission that switches between an idle state in which the outer ring rotates freely in relation to the inner ring and a shift state in which the outer ring rotates synchronously with the inner ring. $MoS_2$ processing is performed on a surface of the tapered roller. The tapered roller bearing includes a fretting suppressing means configured by a ratio of roller dynamic load rating Cr to static load rating Cor being set to Cor/Cr≧1.3.

$MoS_2$ processing refers to a process in which a surface layer section (base material surface layer section) of a component to be coated is coated with $MoS_2$ (molybdenum disulfide). For example, the base material surface layer is melted by heat. Molybdenum disulfide is incorporated into the base material, and the base material surface layer is recrystallized. Therefore, the coated layer is resistant to abrasion, not easily peeled off, and has an excellent sliding-resistance reducing effect. As a result of $MoS_2$ processing being performed on the surface of the tapered roller in this way, frictional resistance between the tapered roller, and the raceway surfaces of the outer ring and the inner ring can be reduced.

A tapered roller bearing according to a third aspect of the present invention includes an outer ring, an inner ring, a tapered roller interposed between the outer ring and the inner ring, and a cage holding the tapered roller. The tapered roller bearing is used in an idler portion of an automobile transmission that switches between an idle state in which the outer ring rotates freely in relation to the inner ring and a shift state in which the outer ring rotates synchronously with the inner ring. The tapered roller bearing includes a fretting suppressing means configured by α≧17.5° when an outer ring raceway surface angle is 2α.

As a result of α≧17.5° being set when the outer ring raceway surface angle is 2α, the contact angle can be increased and the percentage of load placed on the bearing raceway surfaces can be reduced. The percentage of load placed on a collar of the inner ring receiving the tapered roller can be increased. Therefore, the roller length can be increased as a result of the increase in the contact angle.

A tapered roller bearing according to a fourth aspect of the present invention includes an outer ring, an inner ring, a tapered roller interposed between the outer ring and the inner ring, and a cage holding the tapered roller. The tapered roller bearing is used in an idler portion of an automobile transmission that switches between an idle state in which the outer ring rotates freely in relation to the inner ring and a shift state in which the outer ring rotates synchronously with the inner ring. $MoS_2$ processing is performed on a surface of the tapered roller. The tapered roller bearing includes a fretting suppressing means configured by α≧15° when an outer ring raceway surface angle is 2α.

A tapered roller bearing according to a fifth aspect of the present invention includes an outer ring, an inner ring, a tapered roller interposed between the outer ring and the inner ring, and a cage holding the tapered roller. The tapered roller bearing is used in an idler portion of an automobile transmission that switches between an idle state in which the outer ring rotates freely in relation to the inner ring and a shift state in which the outer ring rotates synchronously with the inner ring. The tapered roller bearing includes a fretting suppressing means configured by a ratio of a diameter dimension DW1 of a large end surface of the tapered roller to a length L of the tapered roller being set to L/DW1≧1.85.

The ratio of static load rating to dynamic load rating is correlated with the relationship between the roller length L and the roller diameter DW1 (diameter of the large end surface of the roller). In other words, when the dynamic load rating increases, the roller diameter increases, causing the ratio L/DW1 to become small. When the static load rating increases, the number of rollers increase, causing a reduction in the roller diameter. Therefore, as a result of L/DW1≧1.85 being set, contact surface pressure between the rollers and the raceway surfaces can be reduced to under 2200 MPa.

A tapered roller bearing according to a sixth aspect of the present invention includes an outer ring, an inner ring, a tapered roller interposed between the outer ring and the inner ring, and a cage holding the tapered roller. The tapered roller bearing is used in an idler portion of an automobile transmission that switches between an idle state in which the outer ring rotates freely in relation to the inner ring and a shift state in which the outer ring rotates synchronously with the inner ring. $MoS_2$ processing is performed on a surface of the tapered roller. The tapered roller bearing includes a fretting suppressing means configured by a ratio of a diameter dimension DW1 of a large end surface of the tapered roller to a length L of the tapered roller being set to L/DW1≧1.7.

A roller coefficient γ can be set to exceed 0.94. A window angle of a pocket of the cage can be set to 55° or more and 80° or less. Here, the roller coefficient γ is defined by a following expression. The window angle of the pocket (between columnar sections adjacent in the circumferential direction) 18 refers to an angle of a surface of the columnar section coming into contact with a rolling surface of the tapered roller.

$$\text{Roller coefficient } \gamma = (Z \cdot DA)/(\pi \cdot PCD)$$

where, Z is the number of rollers, DA is an average roller diameter, and PCD is a roller pitch diameter.

The tapered roller bearing is preferably used to support a power transmission shaft of an automotive vehicle.

Advantage of the Invention

In the first, third, and fifth tapered roller bearings of the present invention, contact surface pressure between the tapered roller and the raceway surfaces can be reduced to under 2200 MPa. Therefore, the occurrence of fretting can be suppressed without reducing fatigue life.

In particular, as a result of $MoS_2$ processing being performed on the surface of the tapered roller, as in the second, fourth, and sixth tapered roller bearings, even when the contact surface pressure between the tapered roller and the raceway surfaces does not fall below 2200 MPa, the occurrence of fretting can be prevented with a surface pressure near 2200 MPA. Therefore, as a result of $MoS_2$ processing being performed on the surface of the tapered roller, the occurrence of fretting can be prevented even when Cor/Cr≧1.3, α≧15°, and L/DW1≧1.7. Therefore, settings regarding the relationship between dynamic load rating and static load rating, the outer ring raceway surface angle, the relationship between the roller length and the roller diameter, and the like can be facilitated, and increasing the freedom of design.

When the roller coefficient γ exceeds 0.94, a columnar width of the cage can be increased when contact between the outer ring and the case is avoided in a neutral state. Therefore, the load capacity can be increased to that of a full complement roller bearing (a bearing that does not use cages) without bearing dimensions being changed. As a result, contact surface pressure can be reduced, surface pressure in a stopped state can be reduced, and fretting-resistance can be enhanced. Moreover, a favorable contacting state between the cage and the tapered roller can be ensured, and the roller can roll smoothly.

As a result of the window angle of the cage being 55° or more, a favorable contacting state between the cage and the tapered roller can be ensured. As a result of the window angle of the cage being 80° or less, a pushing force in the radial direction does not increase, and smooth rolling can be achieved.

Therefore, the tapered roller bearing of the present invention is optimal as a bearing supporting the power transmission shaft of an automotive vehicle.

BRIEF DESCRIPTION OF THE DRAWINGS

Figure 6:
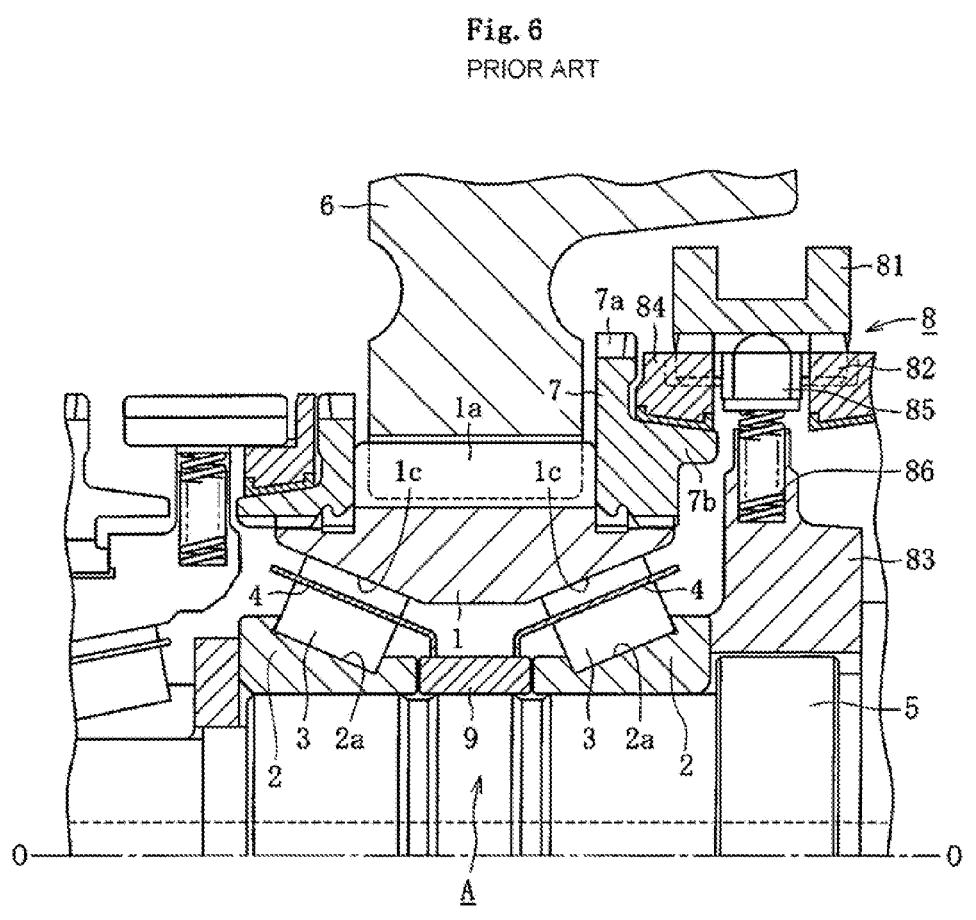

FIG. 6 is a cross-sectional view of main sections of a conventional automobile transmission.

BEST MODE FOR CARRYING OUT THE INVENTION

Embodiments of a tapered roller bearing of the present invention will be described below with reference to FIG. 1 to FIG. 5.

Figure 1:
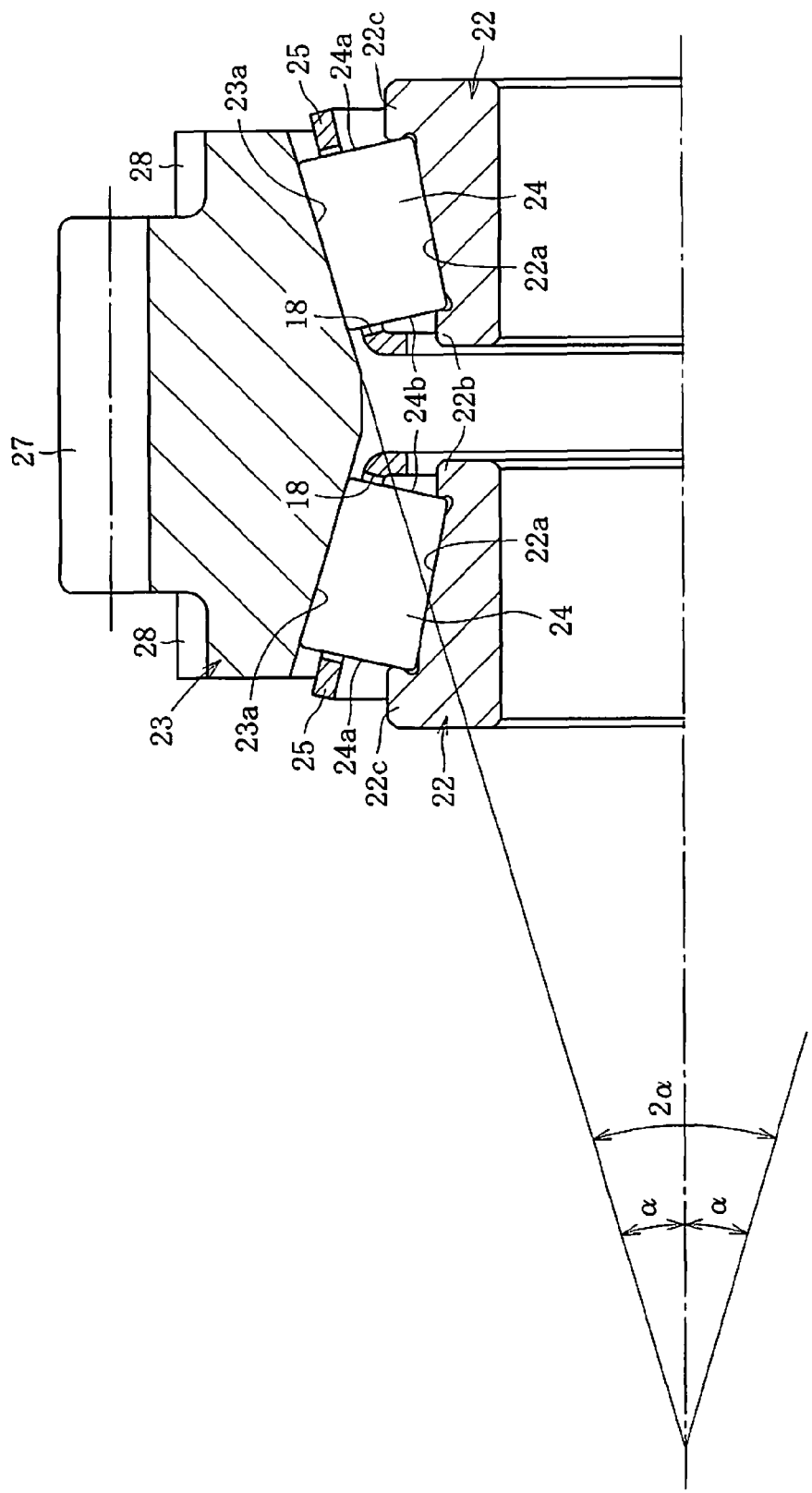
FIG. 1 is a cross-sectional view of main sections of an automobile transmission using a tapered roller bearing according to an embodiment of the present invention.

FIG. 1 is a diagram of an automobile transmission (synchronous mesh-type transmission) using a tapered roller bearing according to a first embodiment of the present invention. A main shaft and a countershaft are disposed in parallel with a predetermined distance therebetween. The main shaft interlocks with an output shaft on a driving wheel side. The countershaft interlocks with an input shaft on an engine side. In other words, a countershaft gear is provided on the countershaft. A main shaft gear configuring an outer ring of the tapered roller bearing of the present invention meshes with the countershaft gear.

In other words, the tapered roller bearing includes a pair of inner rings 22 each having a conical raceway surface 22a, an outer ring 23 having a pair of conical raceway surfaces 23a, a plurality of tapered rollers 24 disposed between the raceway surfaces 22a of the inner rings 22 and the raceway surfaces 23a of the outer ring 23 such as to roll freely, and a cage 25 holding the tapered rollers 24 at an even interval in the circumferential direction. The inner ring 22 has a small collar 22b on the small diameter side and a large collar 22c on the large diameter side. A large end surface 24a of the tapered roller 24 is received by the large collar 22c.

A teeth section 27 that meshes with the countershaft gear of the countershaft is provided on the outer circumferential surface of the outer ring 23. A teeth section 28 that meshes with a clutch gear (not shown) is provided on the axial direction end section of the outer ring 23. A synchro-mechanism (not shown) is disposed adjacent to the clutch gear.

In other words, during neutral, the outer ring (main shaft gear) 23 rotates freely in relation to the inner rings 22. During gear shift by the outer ring (main shaft gear) 23, the outer ring (main shaft gear) 23 rotates synchronously with the inner rings 22 and the main shaft by interlocking via the synchro-mechanism.

The tapered roller bearing includes a fretting suppressing means. In other words, a ratio of roller dynamic load rating Cr to static load rating Cor is set to Cor/Cr≧1.4, thereby configuring the fretting suppressing means. Contact surface pressure between the tapered rollers 24, and the raceway surfaces 23a and the raceway surfaces 22a is determined by the dynamic load rating required in relation to the required bearing life, the ratio of static load rating to dynamic load rating, and the like. Therefore, as a result of the ratio of roller dynamic load rating Cr to static load rating Cor being set to Cor/Cr≧1.4, the contact surface pressure between the rollers and the raceway surfaces can be reduced to under 2200 MPa.

Figure 2:
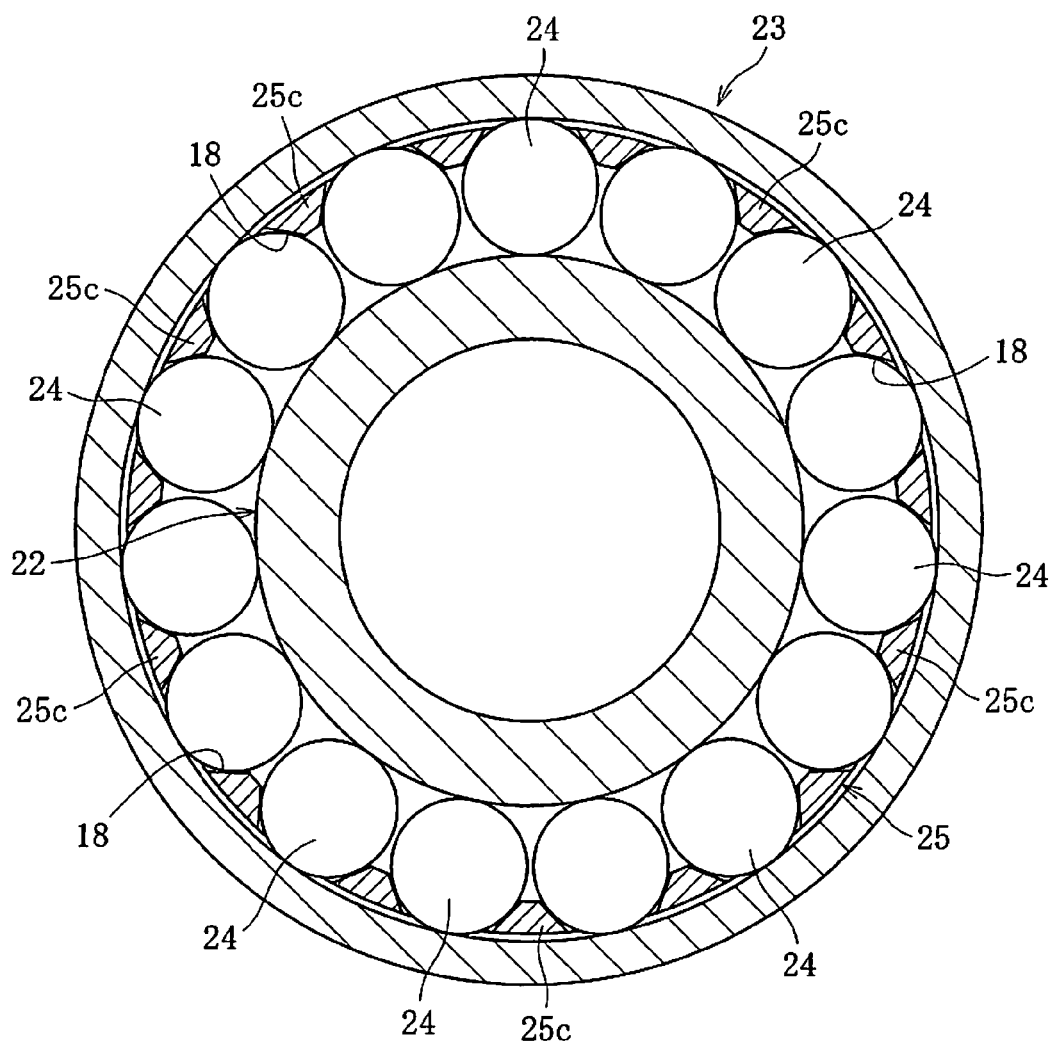
FIG. 2 is a horizontal cross-sectional view of the tapered roller bearing.
Figure 3A:
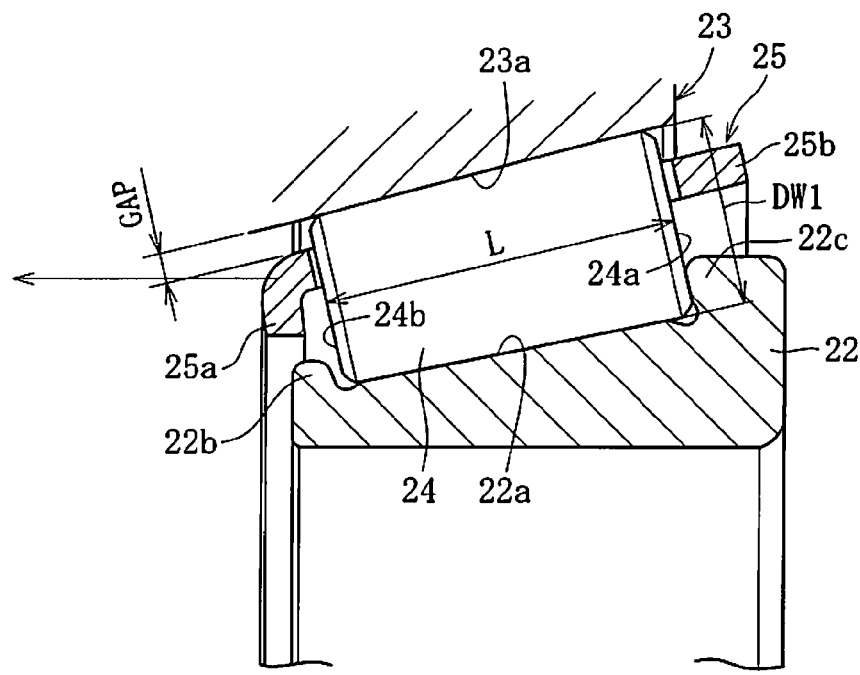
FIG. 3A is a vertical cross-sectional view of the tapered roller bearing before movement in an axial direction.
Figure 3B:
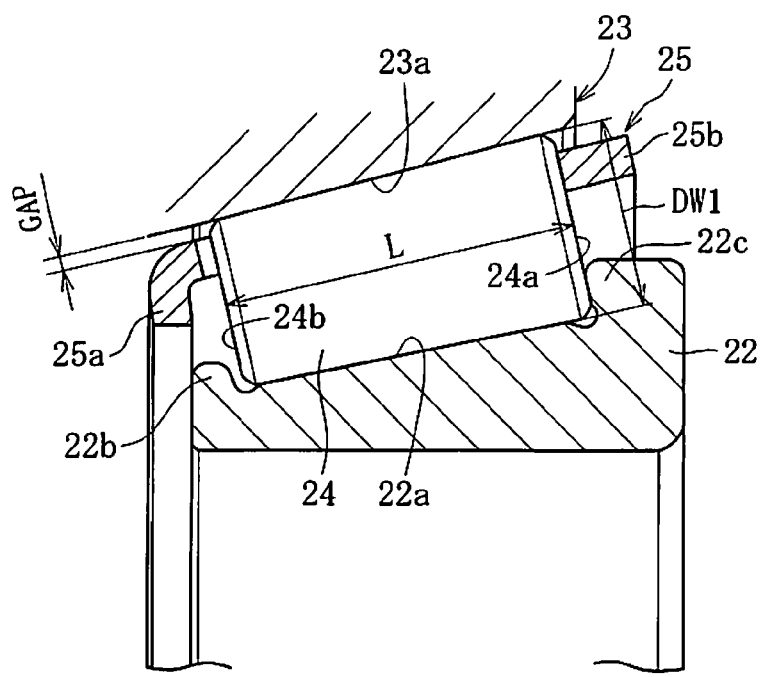
FIG. 3B is a vertical cross-sectional view of the tapered roller bearing after movement in the axial direction.

As shown in FIG. 2, FIG. 3A, and FIG. 3B, the cage 25 includes a small diameter-side ring section 25a, a large diameter-side ring section 25b, and a plurality of columnar sections 25c connecting the small diameter-side ring section 25a and the large diameter-side ring section 25b in the axial direction. A window pushing angle (window angle) θ (see FIG. 5) of a column surface 25d of the columnar section 25c is, for example, 55° or more and 80° or less.

A roller coefficient γ is set to exceed 0.94. Here, the roller coefficient γ is defined by a following expression. The window angle θ of a pocket (between columnar sections adjacent in the circumferential direction) 18 refers to an angle of a surface of the columnar section coming into contact with a rolling surface of the tapered roller 24.

$$\text{Roller coefficient } \gamma = (Z \cdot DA)/(\pi \cdot PCD)$$

where, Z is the number of rollers, DA is an average roller diameter, and PCD is a roller pitch diameter.

The cage 25 is formed, for example, by a metal sheet being press-formed into a conical shape, and each pocket 18 being subsequently formed by press-punching. A flat-rolled steel plate, such as a cold-rolled steel sheet (SPC) or a hot-rolled steel sheet (SPH), a spring steel, and the like can be used as the metal sheet. When the cold-rolled steel sheet (SPC) or the hot-rolled steel sheet (SPH) is used, a surface hardening process, such as carbonitriding or gas nitrocarburizing, is preferably performed on the surface of the steel sheet.

Here, carbonitriding is a method of performing nitriding simultaneously with carburizing to diffuse carbon C and nitrogen N. For example, ammonia (NH3) (0.5% to 1.0%) is added to an ordinary gas carburizing gas atmosphere. Carbonitriding is, for example, performed at a temperature of about 850° C. Gas nitrocarburizing is a method of performing soft-nitriding using gas. The process may use a mixture of ammonia gas and carburizing gas. Alternatively, the method may use degraded urea. Soft-nitriding using a mixture of ammonia gas and carburizing gas at a ratio of 1:1 is a primary method of performing gas nitrocarburizing.

The cage 25 can be made of resin, namely engineering plastics, rather than a metal sheet. Here, engineering plastics refers to materials, among synthetic resins, that mainly have excellent heat-resistance and can be used in fields requiring strength. Engineering plastics include general-purpose engineering plastics and super engineering plastics. Both types of engineering plastics can be used for the cage 25. Representative engineering plastics are given below. These engineering plastics are examples and are not limited thereto.

General-purpose engineering plastics include polycarbonate (PC), polyamide 6 (PA6), polyamide 66 (PA66), polyacetal (POM), modified-polyphenylene ether (m-PPE), polybutylene terephthalate (PBT), glass fiber reinforced polyethylene terephthalate (GF-PET), ultra high molecular weight polyethylene (UHMW-PE), and the like. Super engineering plastics include polysulfone (PSF), polyethersulfone (PES), polyphenylene sulfide (PPS), polyarylate (PAR), polyamide-imide (PAI), polyetherimide (PEI), polyetheretherketone (PEEK), liquid crystal polymers (LCP), thermoplastic polyimide (TPI), polybenzimidazole (PBI), polymethylpentene (TPX), poly(1,4-cyclohexylene dimethylene terephthalate) (PCT), polyamide 46 (PA46), polyamide 6T (PA6T), polyamide 9T (PA9T), polyamide 11 and 12 (PA11 and 12), fluorocarbon resin, polyphthalamide (PPA), and the like.

$MoS_2$ processing is preferably performed on the surfaces of the tapered rollers. Here, $MoS_2$ processing refers to a process in which a surface layer section (base material surface layer section) of a component to be coated is coated with $MoS_2$ (molybdenum disulfide). For example, the base material surface layer is melted by heat. Molybdenum disulfide is incorporated into the base material, and the base material surface layer is recrystallized. Therefore, the coated layer is resistant to abrasion, not easily peeled off, and has an excellent sliding-resistance reducing effect.

Figure 4A:
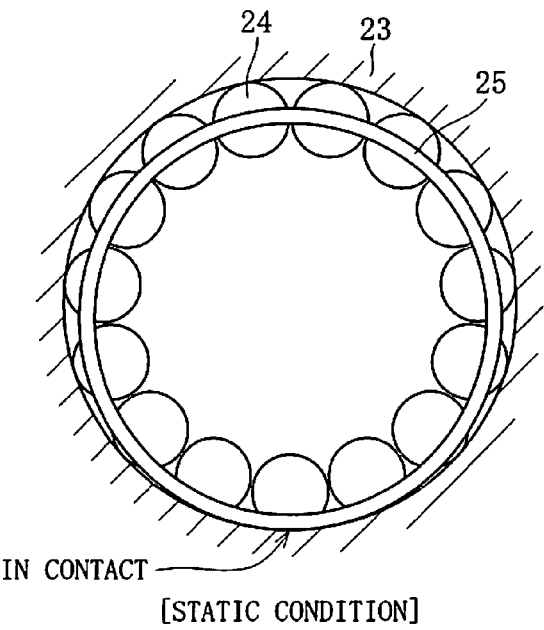
FIG. 4A is a cross-sectional view of a relationship between a cage and an outer ring when the tapered roller bearing is stationary.
Figure 4B:
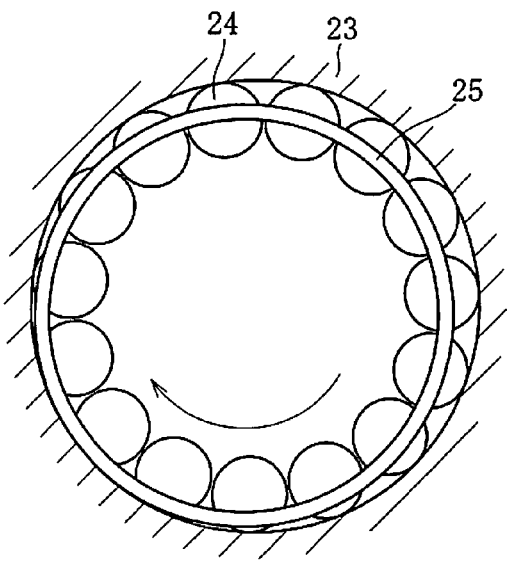
FIG. 4B is a cross-sectional view of the relationship between the cage and the outer ring at the beginning of rotation of the tapered roller bearing.
Figure 4C:
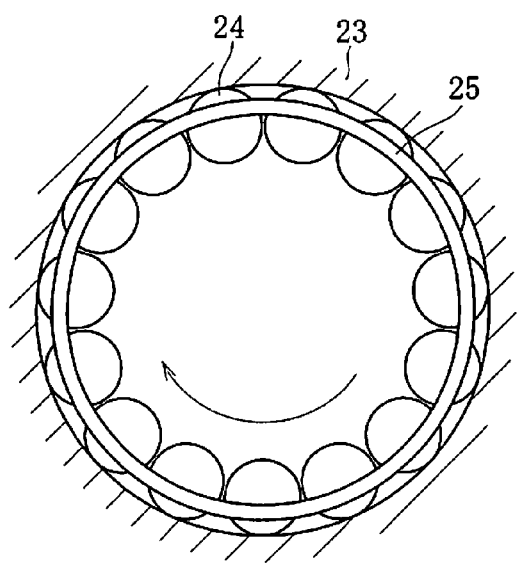
FIG. 4C is a cross-sectional view of the relationship between the cage and the outer ring during the rotation of the tapered roller bearing.
Figure 5:
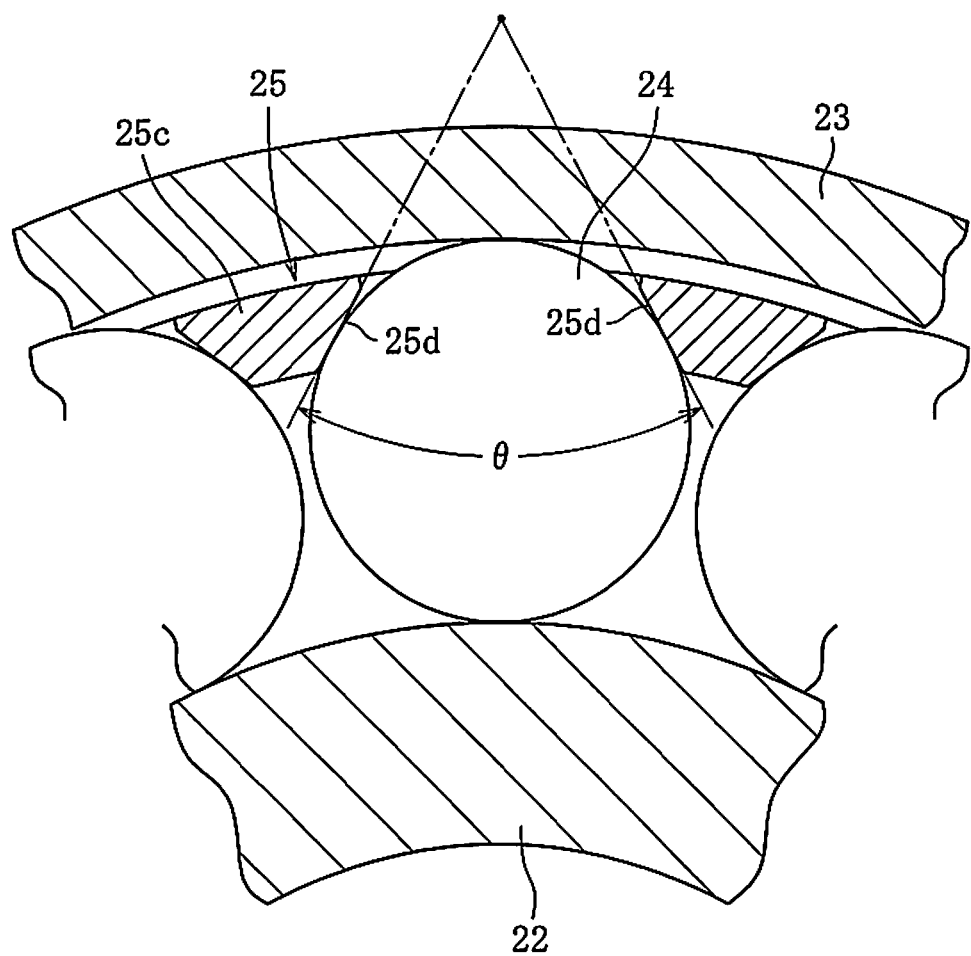
FIG. 5 is an enlarged cross-sectional view of main sections of the tapered roller bearing.

The outer diameter of the cage 25 is set to a dimension allowing a portion of the cage 25 and the outer ring 23 to come into contact when the cage 25 is moved from the state in FIG. 3A towards the small diameter side in the axial direction as indicated by an arrow in FIG. 3A (FIG. 3B), and then moved downward in the radial direction as shown in FIG. 4A. When the bearing rotates and the cage 25 is centered as shown in FIG. 4C, the cage 25 and the outer ring 23 are in a non-contacting state with a predetermined gap therebetween over the entire circumference. In other words, the above-described dimension is that in which, when the cage 25 is disposed in the axial center and is closer to the small diameter side as shown in FIG. 3B, a gap is formed between the cage 25 and the outer ring 23. When the cage 25 is moved in the radial direction from the axial center, the outer ring 23 and the cage 25 come into contact.

As a result, the outer ring 23 and the cage 25 come into contact during the early stage of operation (FIG. 4B), but are not in contact during operation (FIG. 4C). Therefore, increase in drag torque and wear caused by contact can be suppressed. When a cage made of a metal sheet is used, bottom-widening and swaging are required to be performed. However, when a resin cage is used, the processes are not required. Therefore, required dimensional accuracy can be easily ensured. Here, "bottom-widening" refers a process for widening the diameter of the columnar sections on the small diameter side of the cage 25 such that the rollers run over the small collar 22b of the inner ring 22 when the cage 25 on which the tapered rollers 24 are mounted is assembled to the inner ring 22. "Swaging" refers to a process for returning the widened columnar sections on the small diameter side of the cage 25 to its original size by pressing the columnar sections from the outer side using a mold.

In the tapered roller bearing of the present invention, the contact surface pressure between the tapered rollers 24, and the raceway surfaces 23a and the raceway surfaces 22a can reduced to under 2200 MPa. Therefore, the occurrence of fretting can be suppressed without reducing fatigue life. In particular, as a result of $MoS_2$ processing being performed on the surfaces of the tapered rollers 24, frictional resistance between the tapered rollers 24, and the raceway surfaces 23a of the outer ring 23 and the raceway surfaces 22a the inner rings 22 can be reduced. In other words, as a result of $MoS_2$ processing being performed on the surfaces of the tapered rollers 24, even when the contact surface pressure between the tapered rollers 24, and the raceway surfaces 23a and the raceway surfaces 22a is not under 2200 MPa, the occurrence of fretting can be prevented at a surface pressure near 2200 MPa. In this way, when $MoS_2$ processing is performed on the surfaces of the tapered rollers 24, fretting can be suppressed to a mild degree. Therefore, settings regarding the relationship between dynamic load rating and static load rating can be facilitated, increasing the freedom of design.

The window angle θ is set to 55° or more such that the cage 25 and the outer ring 23 are not in contact and a gap is formed therebetween when the cage 25 is in a neutral state, and a portion of the cage 25 comes into contact with the outer ring 23 as a result of movement of the cage 25 in the radial direction from the neutral state. As a result, a column width of the cage 25 can be increased. Therefore, load capacity can be increased to that of a full complement roller bearing (a bearing that does not use a cage) without bearing dimensions being changed. As a result, contact surface pressure can be reduced, surface pressure in a stopped state can be reduced, and fretting-resistance can be enhanced. Moreover, a favorable contacting state between the cage 25 and the tapered rollers 24 can be ensured, and the tapered rollers 24 can roll smoothly.

When the roller coefficient γ exceeds 0.94, the column width of the cage can be increased when contact between the outer ring and the cage is avoided in the neutral state. Therefore, the load capacity can be increased to that of a full complement roller bearing (a bearing that does not use a cage) without bearing dimensions being changed. As a result, contact surface pressure can be reduced, surface pressure in a stopped state can be reduced, and fretting-resistance can be enhanced. Moreover, a favorable contacting state between the cage and the tapered rollers can be ensured, and the tapered rollers can roll smoothly.

Because the window angle of the cage is set to 55° or more, a favorable contacting state with the tapered rollers can be ensured. Because the window angle of the cage is set to 80° or less, pushing force in the radial direction does not increase, and smooth rolling can be achieved. In other words, when the window angle is less than 55°, a favorable contacting state with the tapered rollers 24 is difficult to achieve. When the window angle exceeds 80°, the pushing force in the radial direction becomes too strong, making smooth rolling difficult to achieve.

Therefore, the tapered roller bearing of the present invention is optimal for a bearing that supports a transmission shaft of an automotive vehicle.

When the cage 25 is made of a metal sheet, rigidity of the cage 25 can be enhanced. The tapered rollers 24 can be stably held over a long period. In addition, the metal cage 25 has excellent oil-resistance, and degradation of materials caused by oil immersion is prevented. When the cage 25 is made of resin, because the cage 25 is light-weight and friction coefficient is small, the cage 25 is suitable for reducing torque loss and cage wear when the bearing begins to operate.

According to a second embodiment, the fretting suppressing means can be configured such that, when an outer ring raceway surface angle is $2\alpha$, $\alpha \geq 17.5°$. When $\alpha \geq 17.5°$ when the outer ring raceway surface angle is $2\alpha$, the contact angle can be increased and the percentage of load placed on the bearing raceway surfaces can be reduced. The percentage of load placed on the collars 22a of the inner rings 22 receiving the tapered rollers 24 can be increased. Therefore, the roller length can be increased as a result of the increase in the contact angle. Therefore, contact surface pressure can be significantly reduced. Contact surface pressure between the rollers and the raceway surfaces can be reduced to under 2200MPa.

According to a third embodiment, the fretting suppressing means is configured such that a ratio of a diameter DW1 of the large end surface 24a of the tapered roller 24 to a tapered roller length L is set to $L/DW1 \geq 1.85$. Here, the diameter of the large end surface 24a of the tapered roller 24 is a maximum outer diameter dimension when a chamfered section is not formed on an outer-diameter edge section of the large end surface 24a, as shown in FIG. 3A and FIG. 3B.

The ratio of static load rating in relation to dynamic load rating is correlated with the relationship between the roller length L and the roller diameter DW1 (diameter of the large end surface of the roller). In other words, when the dynamic load rating increases, the roller diameter increases, causing the ratio L/DW1 to become small. When the static load rating increases, the number of rollers increase, causing a reduction in the roller diameter. Therefore, as a result of $L/DW1 \geq 1.85$ being set, contact surface pressure between the rollers and the raceway surfaces can be reduced to under 2200 MPa.

As a result of MoS$_2$ processing being performed on the surfaces of the tapered rollers 24, even when the contact surface pressure between the tapered rollers 24 and the raceway surfaces is not under 2200 MPa, the occurrence of fretting can be prevented at a surface pressure near 2200 MPa. In this way, when MoS$_2$ processing is performed on the surfaces of the tapered rollers 24, fretting can be suppressed to a mild degree. Therefore, settings involving the relationship between dynamic load rating and static load rating can be facilitated, increasing the freedom of design. Therefore, when MoS$_2$ processing is performed on the surfaces of the tapered rollers 24, $\alpha$ can be equal to or greater than 15°, and L/DW1 can be equal to or greater than 1.7. The occurrence of fretting can be prevented. Therefore, settings regarding the outer ring raceway surface angle, the relationship between the roller length and the roller diameter, and the like can be facilitated, increasing the freedom of design.

Embodiments of the present invention are described above. However, the present invention is not limited to the above-described embodiments. Various modifications can be made. For example, the number of tapered rollers 24 disposed can be arbitrarily determined. To increase strength, resin materials or other engineering plastics to which glass fibers, carbon fibers, and the like are added can be used for the cage 25.

Example 1

Sample products were manufactured with various changes made to the ratio of dynamic load rating to static load rating. The occurrence of fretting in each sample product was examined. The results are shown in the following Table 1. In sample a in Table 1, Cor=35kN, Cr=35kN, and Cor/Cr=1.0. In sample b, Cor=45.5kN, Cr=35kN, and Cor/Cr=1.3. In sample c, Cor=49kN, Cr=35kN, and Cor/Cr=1.4. In sample d, Cor=52.5kN, Cr=35kN, and Cor/Cr=1.5. Each sample has two types of rollers, standard rollers (not processed with MoS$_2$) and MoS$_2$ rollers (processed with MoS$_2$). The standard rollers and the MoS$_2$ rollers in the sample a, and the standard rollers in the sample b are conventional products. The standard rollers and the MoS$_2$ rollers in the other samples c and d, and the MoS$_2$ rollers in the sample b are products of the present invention. In the ordinary conventional products, Cor/Cr<1.3.

TABLE 1

| | | Maximum contact | Occurrence of fretting | |
|---|---|---|---|---|
| | Cor/Cr | surface pressure | Standard roller | MoS$_2$ roller |
| a | 1.0 | 2300 MPa | Yes | Yes |
| b | 1.3 | 2200 MPa | Yes | Mild |
| c | 1.4 | 2100 MPa | Mild | No |
| d | 1.5 | 1950 MPa | No | No |

As is clear from Table 1, the maximum contact surface pressure is 2300 MPa when Cor/Cr=1.0. Fretting occurs in the standard rollers and the MoS$_2$ rollers. The maximum contact surface pressure is 2200 MPa when Cor/Cr=1.3. Fretting occurs in the standard rollers. Mild fretting occurs in the MoS$_2$ rollers. The maximum contact surface pressure is 2100 MPa when Cor/Cr=1.4. Mild fretting occurs in the standard rollers. Fretting does not occur in the MoS$_2$ rollers. The maximum contact surface pressure is 1950 MPa when Cor/Cr=1.5. Fretting occurs in neither the standard rollers nor the MoS$_2$ rollers.

Therefore, in the standard rollers, the occurrence of fretting is mild when Cor/Cr=1.4. In the MoS$_2$ rollers, the occurrence of fretting mild when Cor/Cr=1.3.

Example 2

Sample products were manufactured with various changes made to the outer ring raceway surface angle ($2\alpha$). The occurrence of fretting in each sample product was examined. The results are shown in the following Table 2. In sample e in Table 2, $\alpha=12.5°$. In sample f, $\alpha=15.0°$. In sample g, $\alpha=17.5°$. In sample h, $\alpha=20.0°$. In this instance as well, each sample has two types of rollers, the standard rollers and the MoS$_2$ rollers. The standard rollers and the MoS$_2$ rollers in the sample e, and the standard rollers in the sample f are conventional products. The standard rollers and the MoS$_2$ rollers in the other samples g and h, and the MoS$_2$ rollers in the sample f are products of the present invention. In the ordinary conventional products, $\alpha \leq 17°$ to minimize space and the like.

TABLE 2

| | A | Maximum contact surface pressure | Occurrence of fretting | |
| | | | Standard roller | MoS$_2$ roller |
| --- | --- | --- | --- | --- |
| e | 12.5° | 2300 MPa | Yes | Yes |
| f | 15° | 2200 MPa | Yes | Mild |
| g | 17.5° | 2100 MPa | Mild | No |
| h | 20° | 2000 MPa | No | No |

As is clear from Table 2, the maximum contact surface pressure is 2300 MPa when α=12.5°. Fretting occurs in the standard rollers and the MoS$_2$ rollers. The maximum contact surface pressure is 2200 MPa when α=15.0°. Fretting occurs in the standard rollers. Mild fretting occurs in the MoS$_2$ rollers. The maximum contact surface pressure is 2100 MPa when α=17.5°. Mild fretting occurs in the standard rollers. Fretting does not occur in the MoS$_2$ rollers. The maximum contact surface pressure is 1950 MPa when α=20.0°. Fretting occurs in neither the standard rollers nor the MoS$_2$ rollers.

Therefore, in the standard rollers, the occurrence of fretting is mild when α=17.5°. In the MoS$_2$ rollers, the occurrence of fretting mild when α=15.0°.

Example 3

Sample products were manufactured with various changes made to the ratio of the roller diameter (DW1) to the roller length (L). The occurrence of fretting in each sample product was examined. The results are shown in the following Table 3. In sample i in Table 3, L=10 mm, DW1=8 mm, and L/DW1=1.25. In sample j, L=11.2 mm, DW1=8 mm, and L/DW1=1.40. In sample k, L=15.5 mm, DW1=10 mm, and L/DW1=1.55. In sample l, L=15.3 mm, DW1=9 mm, and L/DW1=1.70. In sample m, L=18.5 mm, DW1=10 mm, and L/DW1=1.85. In sample n, L=115 mm, DW1=7.5 mm, and L/DW1=2.00. In this instance as well, each sample has two types of rollers, the standard rollers and the MoS$_2$ rollers. The standard rollers and the MoS$_2$ rollers in the samples i, j, and k, and the standard rollers in the sample 1 are conventional products. The standard rollers and the MoS$_2$ rollers in the other samples m and n, and the MoS$_2$ rollers in the sample 1 are products of the present invention. In the ordinary conventional products, L/DW1<1.80.

TABLE 3

| | L/DW1 | Maximum contact surface pressure | Occurrence of fretting | |
| | | | Standard roller | MoS$_2$ roller |
| --- | --- | --- | --- | --- |
| i | 1.25 | 2500 MPa | Yes | Yes |
| j | 1.4 | 2400 MPa | Yes | Yes |
| k | 1.55 | 2300 MPa | Yes | Yes |
| l | 1.7 | 2200 MPa | Yes | Mild |
| m | 1.85 | 2100 MPa | Mild | No |
| n | 2.0 | 1950 MPa | No | No |

As is clear from Table 3, the maximum contact surface pressure is 2500 MPa when L/DW1=1.25. Fretting occurs in the standard rollers and the MoS$_2$ rollers. The maximum contact surface pressure is 2400 MPa when L/DW1=1.40. Fretting occurs in the standard rollers and the MoS$_2$ rollers. The maximum contact surface pressure is 2300 MPa when L/DW1=1.55. Fretting occurs in the standard rollers and the MoS$_2$ rollers. The maximum contact surface pressure is 2200 MPa when L/DW1=1.70. Fretting occurs in the standard rollers. Mild fretting occurs in the MoS$_2$ rollers. The maximum contact surface pressure is 2100 MPa when L/DW1=1.85. Mild fretting occurs in the standard rollers. Fretting does not occur in the MoS$_2$ rollers. The maximum contact surface pressure is 1950 MPa when L/DW1=2.00. Fretting occurs in neither the standard rollers nor the MoS$_2$ rollers.

Therefore, in the standard rollers, the occurrence of fretting is mild when L/DW1=1.85. In the MoS$_2$ rollers, the occurrence of fretting mild when L/DW1=1.70.

The invention claimed is:

1. A tapered roller bearing comprising:
an outer ring;
an inner ring;
a tapered roller interposed between the outer ring and the inner ring; and
a cage holding the tapered roller,
wherein the tapered roller bearing is for being used in an idler portion of an automobile transmission that switches between an idle state in which the outer ring rotates freely in relation to the inner ring and a shift state in which the outer ring rotates synchronously with the inner ring,
wherein the tapered roller bearing has a ratio of static load rating Cor to dynamic load rating Cr of Cor/Cr≧1.4.

2. The tapered roller bearing of claim 1,
wherein an outer ring raceway surface angle is 2α, and α≧17.5°.

3. The tapered roller bearing of claim 2, wherein a roller coefficient γ exceeds 0.94.

4. The tapered roller bearing of claim 2, wherein a window angle of a pocket of the cage is 55° or more and 80° or less.

5. An automobile transmission comprising:
the tapered roller bearing of claim 2; and
a power transmission shaft,
wherein the tapered roller bearing supports the power transmission shaft.

6. The tapered roller bearing of claim 1, wherein a ratio of a length L of the tapered roller to a diameter dimension DW1 of a large end surface of the tapered roller is L/DW1≧1.85.

7. The tapered roller bearing of claim 6, wherein a roller coefficient γ exceeds 0.94.

8. The tapered roller bearing of claim 6, wherein a window angle of a pocket of the cage is 55° or more and 80° or less.

9. An automobile transmission comprising:
the tapered roller bearing of claim 6; and
a power transmission shaft,
wherein the tapered roller bearing supports the power transmission shaft.

10. The tapered roller bearing of claim 1, wherein a roller coefficient γ exceeds 0.94.

11. The tapered roller bearing of claim 1, wherein a window angle of a pocket of the cage is 55° or more and 80° or less.

12. An automobile transmission comprising:
the tapered roller bearing of claim 1; and
a power transmission shaft,
wherein the tapered roller bearing supports the power transmission shaft.

13. A tapered roller bearing comprising:
an outer ring;
an inner ring;
a tapered roller interposed between the outer ring and the inner ring; and
a cage holding the tapered roller,
wherein the tapered roller bearing is for being used in an idler portion of an automobile transmission that switches between an idle state in which the outer ring rotates freely in relation to the inner ring and a shift state in which the outer ring rotates synchronously with the inner ring, wherein $MoS_2$ processing is performed on a surface of the tapered roller, and wherein the tapered roller bearing has a ratio of static load rating Cor to dynamic load rating Cr of Cor/Cr>1.3.

14. The tapered roller bearing of claim 13,
wherein an outer ring raceway surface angle is $2\alpha$, and $\alpha \geqq 15°$.

15. The tapered roller bearing of claim 14, wherein a roller coefficient $\gamma$ exceeds 0.94.

16. The tapered roller bearing of claim 14, wherein a window angle of a pocket of the cage is 55° or more and 80° or less.

17. An automobile transmission comprising:
the tapered roller bearing of claim 14; and
a power transmission shaft,
wherein the tapered roller bearing supports the power transmission shaft.

18. The tapered roller bearing of claim 13, wherein a ratio of a length L of the tapered roller to a diameter dimension DW1 of a large end surface of the tapered roller is $L/DW1 \geqq 1.7$.

19. The tapered roller bearing of claim 18, wherein a roller coefficient $\gamma$ exceeds 0.94.

20. The tapered roller bearing of claim 18, wherein a window angle of a pocket of the cage is 55° or more and 80° or less.

21. An automobile transmission comprising:
the tapered roller bearing of claim 18; and
a power transmission shaft,
wherein the tapered roller bearing supports the power transmission shaft.

22. The tapered roller bearing of claim 13, wherein a roller coefficient $\gamma$ exceeds 0.94.

23. The tapered roller bearing of claim 13, wherein a window angle of a pocket of the cage is 55° or more and 80° or less.

24. An automobile transmission comprising:
the tapered roller bearing of claim 13; and
a power transmission shaft,
wherein the tapered roller bearing supports the power transmission shaft.

* * * * *